United States Patent
Manner

[11] Patent Number: 5,851,571
[45] Date of Patent: Dec. 22, 1998

[54] NEEDLE VALVE NOZZLE FOR INJECTION MOLDS AND VALVE NEEDLE

[76] Inventor: Otto Manner, Unter Gereuth 9, 79353 Bahlingen, Germany

[21] Appl. No.: 824,647

[22] Filed: Mar. 24, 1997

[30] Foreign Application Priority Data

Apr. 10, 1996 [DE] Germany .................. 196 14 171.0
May 24, 1996 [DE] Germany .................. 196 21 084.4

[51] Int. Cl.⁶ .................................................. B29C 45/23
[52] U.S. Cl. ..................... 425/564; 264/328.9; 425/549; 425/566; 425/568
[58] Field of Search .................... 425/564, 566, 425/568, 569, 549; 264/328.9, 328.15

[56] References Cited

U.S. PATENT DOCUMENTS

| | | | |
|---|---|---|---|
| 4,521,179 | 6/1985 | Gellert | 425/566 |
| 4,925,384 | 5/1990 | Männer | 425/564 |
| 5,049,062 | 9/1991 | Gellert | 425/549 |
| 5,162,125 | 11/1992 | Akselrud et al. | 425/564 |
| 5,324,190 | 6/1994 | Frei | 425/549 |
| 5,324,191 | 6/1994 | Schmidt | 425/549 |

FOREIGN PATENT DOCUMENTS

3442023 A1  5/1986  Germany .
4315076 A1  11/1993  Germany .

*Primary Examiner*—Patrick Ryan
*Assistant Examiner*—Joseph Leyson
*Attorney, Agent, or Firm*—Panitch Schwarze Jacobs & Nadel, P.C.

[57] ABSTRACT

A needle valve nozzle (1) with injection mold (2) has a channel (11) for injection molding of flat workpieces form its narrow side. The channel (11) lies in the interior of the valve needle (10) belonging to the nozzle and extends over a partial longitudinal region of this valve needle (10). The channel (11) has an inlet (12) in the interior of the housing (6) of the needle valve nozzle (1) and at least one lateral exit (13) at an outlet before the free end (10a) of the valve needle (10) facing the injection mold (2), so that the open position of the needle valve nozzle provided for injection molding is reached by pushing the valve needle (10) with this exit (13) so far out of the housing (6) that the lateral exit (13) comes to lie at the level of the mold or cavity to be filled, while for the closed position, the valve needle (10) with this exit (13) can be retracted into the housing (6).

18 Claims, 3 Drawing Sheets

NEEDLE VALVE NOZZLE FOR INJECTION MOLDS AND VALVE NEEDLE

BACKGROUND OF THE INVENTION

The invention concerns a needle valve nozzle with injection mold, which needle valve nozzle has a housing and a material feed to the housing and into the interior of the housing, and an axially adjustable valve needle in this housing, as well as a material outlet which can be closed by means of this valve needle.

Needle valve nozzles of this type are known in various forms and constructions. For example, such a needle valve nozzle is known from U.S. Pat. No. 4,925,384. The needle valve nozzle outlet is located on a housing end which can be set on the injection mold, and is constructed as an aperture of this housing into which the valve needle enters in its closed position, and from which the valve needle can be axially retracted for opening into the injection molding position. Once the injection process is completed, the valve needle is thus advanced again so far that the aperture of the housing serving as an outlet is basically filled up by the free end of the valve needle so that no further material can pass through this outlet.

When injection molding with such a needle valve nozzle, one cannot as a rule avoid at least a trace of flashing being recognizable on the injected workpiece. Chiefly in direct injection molding of very flat workpieces, an additional sprue or gating system must be provided on these, which must subsequently be removed by stamping. This sprue piece which is to be removed by stamping is also designated as a "film sprue." Such a film sprue means enlarging the mold, and moreover an additional work expenditure, especially with subsequent stamping.

SUMMARY OF THE INVENTION

Underlying the invention is an object of creating a needle valve nozzle of the type mentioned at the beginning, wherein the film sprue which is necessary for producing flat injection molding parts can be avoided. This object is accomplished in that the valve needle has a material supply channel running lengthwise in its interior, that this channel is shorter than the valve needle, that an inlet leading through the valve needle into the channel is provided in the housing interior, that this channel has as an outlet at least one lateral exit before of the free end of the valve needle, and that the valve needle with the area having this outlet protrudes out of a passage for the needle valve nozzle and/or engages into the injection mold in its injection molding position.

In contrast with the prior state of the art, in an unusual manner, the injection molding materials are not directly injected into the mold through the passage of the needle valve nozzle housing after the valve needle has been retracted in an axial direction. Instead, the valve needle is moved in the opposite direction, so that the exit provided on it as an outlet emerges from the housing, so that the injection molding material can then be injected directly into the mold aimed by the needle itself. The housing passage thus serves as an additional needle guide in this case, and (in a manner yet to be explained) also as a means for closing the exit.

Through this construction of the needle valve nozzle, with at least one lateral exit from a channel in the interior of the valve needle, it is also possible to injection mold even very flat objects directly, because the exit from the needle, for example in an axial direction, is constructed appropriately narrow (as a slit or a right angled or even circular hole), and can be positioned laterally directly on the flat mold, so that the material fed through the channel in the needle can enter directly laterally from the needle into this flat mold. Through this direct exhaust of the exit upon the mold and therewith upon the injection molded workpiece, it is possible to completely separate the material found in the passage while taking the workpiece out of the mold and/or when the retraction of the needle has previously taken place completely so that no deadhead is recognizable on the workpiece.

It is at the same time appropriate if the channel ends in the interior of the valve needle before its free end, especially at the lateral exit. In this way, a dead space can be avoided, in comparison with a channel possibly running a bit further in the interior of the valve needle.

The lateral exit(s) of the valve needle can be closed by the internal wall of the needle valve nozzle housing passage in the position following retraction from the injection molding position. The passage for the valve needle consequently acquires another function to this extent. For on the one hand, it guides the free end of the needle, and on the other hand closes the lateral exit when the needle has been retracted. Consequently, the passage and the needle together retain the function of blocking the feeding of material to the mold in the closed position. Nevertheless, for this, the needle is pushed in the opposite direction in comparison with the previous solution.

It is at the same time especially advantageous if the valve needle with its lateral or radial exit can be retracted so far into the housing and its passage that in the closed position thus assumed the exit is positioned in the effective area of a heater provided in the housing. The material located in the interior of the valve needle consequently thus remains heated and therefore liquid in the closed position so that it can be extruded out of the valve needle in a new injection molding process immediately and without prior cleaning operations.

The length of the channel arranged, in particular, coaxially and centrally in the interior of the valve needle can be so proportioned that even the inlet into the channel is situated within the housing and/or within a needle guide belonging to the housing when the needle is retracted into the closed position. A further reaching extension of the channel is not necessary. It rather suffices for this channel to be present only over a relatively partial length of the valve needle which can have a full cross section in the usual manner outside this area. Practically speaking, this channel arranged in the interior of the valve needle need only be long enough to connect the interior of the needle valve nozzle with the mold when the valve needle is pushed out.

One embodiment of the invention can comprise the channel installed in the interior of the valve needle having several lateral exits which go off radially or obliquely and/or over a curved segment from the channel and lead to the exterior of the needle, and are all arranged in the same cross sectional plane of the needle or at an axial distance to one another in the valve needle. Several exits can serve either to injection mold a large, very flat workpiece, or even to produce several workpieces with one needle valve nozzle at the same time. With a spatially molded workpiece, exits can also operate arranged axially at a distance to one another on the valve needle.

Since the channel in the interior of the valve needle ends in particular at the exit before its free end, there results a certain projecting length beyond this channel at the free end. It is appropriate when the portion of the valve needle extending beyond the end of the channel and its lateral exit is constructed as a sealing extension which in the closed position fills up the housing passage and in particular, partially extends beyond this passage out of the housing and is aligned with the mold insert accommodating the valve needle and/or the core mold insert acting in conjunction with it. On the one hand, the exit seal within the housing passage is improved, and on the other hand, the mold insert or the core mold insert can guide this extension, so that when the valve needle is moved into the open position, the exit can reach the mold with the greatest possible precision.

The injection side mold insert which accommodates the valve needle and the core mold insert of the injection mold which acts in conjunction with it can have a hole or a boring coaxially to and aligned with the needle valve nozzle housing passage, whose internal cross section corresponds to the external cross section of the sealing extension of the valve needle. This extension of the valve needle can engage, especially tightly, into the hole or boring of the core mold insert in its injection position. The valve needle is consequently not only held and sealed by the housing during the injection process, but also by the core mold insert, so that reactive forces generated when material is extruded out of the lateral exit cannot lead to a deflection of the valve needle. Moreover, the guidance of the valve needle in its adjustment motions is improved. Finally, injection molding material is prevented from going anywhere but into the mold provided.

The edge of the lateral exit(s) nearer to the free end and the sealing extension can be constructed as a rim and, with a certain extension or length of this rim, the needle can if necessary be flattened in the area of the rim or of the lateral exit. In this way, a wider stream of material can be extruded and be interrupted by the rim when retracting the needle without a sprue or gating system.

If the lateral exit is adapted to the thickness of the flat workpiece to be molded in its axial extension, and to the narrow side of the workpiece in its alignment running crosswise to this, or if the rim is brought into alignment with the appropriate boundary of the mold, the material situated in the needle can be separated from the material without a sprue when the needle is retracted, so no flashing can remain on the workpiece on the basis of the direct injection from the exit into the mold owing to this separation process. Consequently, that room for a sprue or gate must also be taken into consideration can thus be avoided, because the material can be injected directly into the mold itself from the needle exit.

The inlet into the channel arranged in the valve needle can be formed by a lateral recess or milling of the needle which constitutes a cutout at the beginning of the channel. To be sure, the inlet into the channel could be formed by a boring or slotting. Nonetheless, a milled out recess is more favorable to the extent that in this way a constant access is created for the material which better accounts for the channel cross section so that as little resistance as possible occurs through deflections or the like. At the same time, the channel can end in the area of the lateral recess, so that dead spaces are also avoided at this point.

For a particularly favorable material and raw material feed, it is advantageous if the recess, starting out slightly obliquely and gradually increasing in the direction of the extension of the needle, is worked into the needle cross section at its beginning which faces away from the free end of the needle, so that together with the interior wall of the housing of the needle valve nozzle, a basically impedance-free constant material feed to the channel is established. At the same time, the housing wall can run obliquely in the appropriate direction, so that a basically constant cross section is also retained for feeding material, and thereby correspondingly good conditions for the inflowing material and feeding it evenly.

The valve needle can have an essentially circular cross section and the channel can be positioned in the center of this cross section, and preferably can likewise have a circular cross section. Such parts and channels with a circular cross section can be manufactured especially simply. For example, the channel can be bored into the needle from the free end and then be closed by a part which is put on or inserted. The needle itself can likewise have a circular cross section in the known manner, which is only partially circular solely in the recess area. The guide openings and borings for the needle can consequently be manufactured appropriately simply.

In order that the material fed within the needle valve nozzle is not divided into two currents by the needle, and is conducted as directly as possible to the recess and the channel in the needle interior, it is appropriate for the internal cavity of the housing to be arranged eccentrically on the side of the recess arranged in the valve needle serving to feed material into the channel, and for the housing to have a guide in its interior for the valve needle positioned concentrically in it, in particular on the side facing away from this interior cavity which extends over more than half the periphery of the valve needle, so that a gap for the passage of the injection molding material remains free in this guide in the area of the needle recess. Consequently, the injection molding material can pass through this gap directly to the recess, and thereby into the channel in the valve needle interior without flowing around the outside of the valve needle.

A needle guide constructed as a bushing which encloses the valve needle over its entire cross section can be positioned on the end opposite the housing exit, and the material feed into the interior of the housing can be constructed as a feeder channel whose inlet runs from the face to its' opening in the housing interior through the needle guide bushing which forms a part of the face in a radial direction of the needle valve nozzle. In this connection, an insulation, for example an air gap, is situated between the exterior of the bushing and the recess of the nozzle housing which accommodates this, at least in the area opposite its abutment adjacent to the mold insert. Heat losses can consequently be avoided precisely in this area, so that the material reaches the housing, and therewith also the channel in the interior of the needle, as best as possible in a fluid state. The danger of a premature solidification of the material is ruled out. Due to this measure the heating provided on the exterior of the needle valve nozzle can then be operated with smaller output under certain circumstances, than when larger heat losses occurring on the material pathway must be taken into consideration.

Overall, a needle valve nozzle results with which, in comparison with previous systems, the outlet for the material is fashioned as an exit of a channel positioned in the interior of the valve needle. Thus, the material is led into a mold through the needle itself and its exit prior to injection, which permits guiding this material at right angles to the needle extension, so that very flat workpieces can be practically injected from its narrow side. Since the exit has a form corresponding to the narrow side of the workpiece or the mold, a film sprue is no longer required. Consequently, no visible parts of such a flashing occur on the finished product. By shifting the materials pathway partially into the needle, space can also be saved in the mold which would otherwise be necessary for a film sprue. Above and beyond this, stamping such a film sprue and the resultant waste can be avoided. Since removal of the film sprue and a refinishing of the workpiece is avoided by the arrangement of the invention, a corresponding saving of time also results in injection molding such flat workpieces.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings depicted in partially schematic representation.

DETAILED DESCRIPTION OF THE INVENTION

Figure 1:
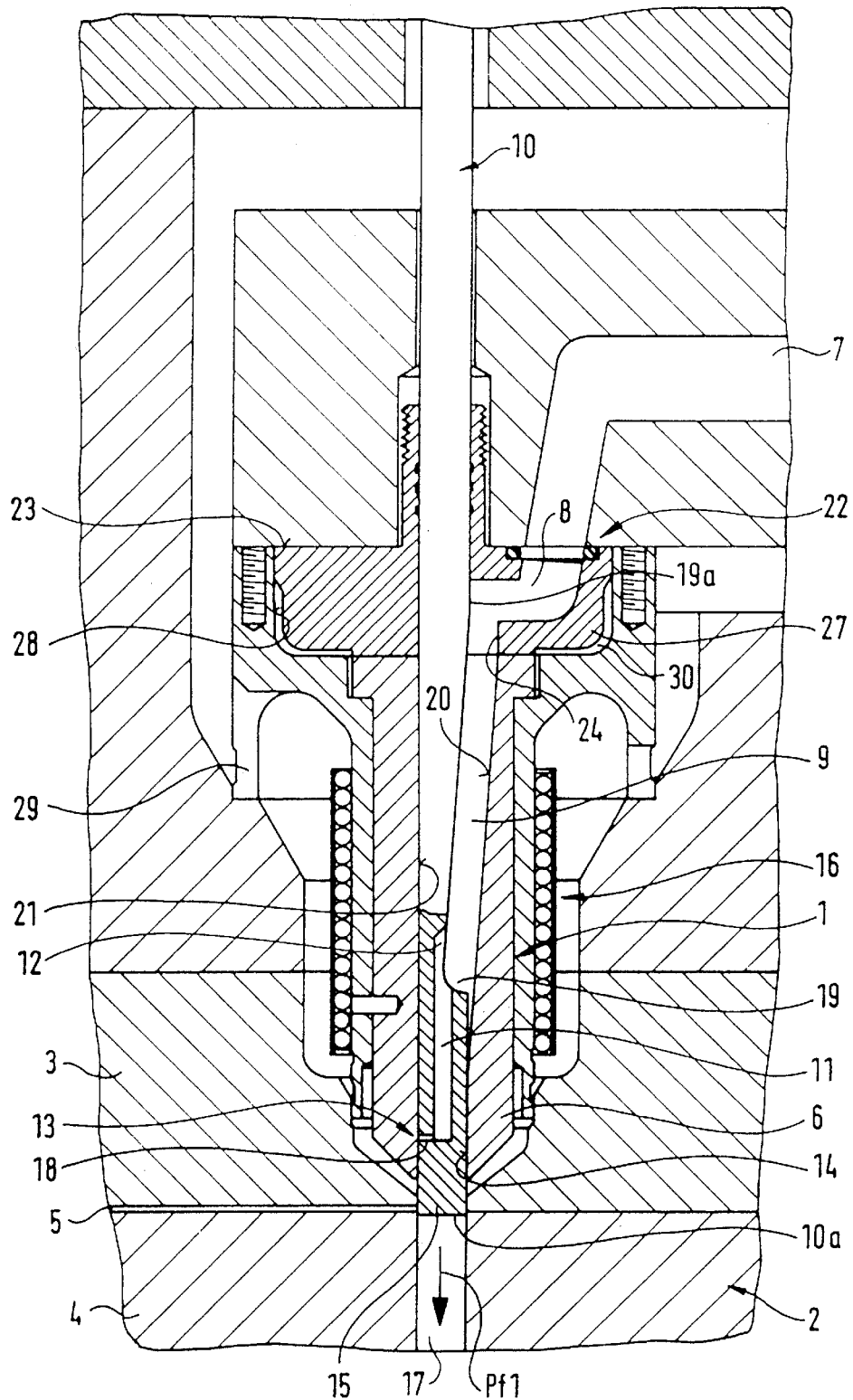
FIG. 1 is a partial longitudinal section through a needle valve nozzle of the invention and the parts of the injection mold adjacent to this, wherein the valve needle with its channel situated in the interior and lateral exit for the material is retracted into the closed position.

A needle valve nozzle designated as a whole with 1 is inserted with a material dispensing end into an injection mold designated as a whole by 2, whereby a mold insert 3 partially accommodates the needle valve nozzle 1 therein, while a further mold insert 4, for example the core mold insert, completes the injection mold 2. The mold 5 itself is situated between the two mold inserts 3 and 4, the cavity of which is partially worked into mold insert 3 and mold insert 4.

The needle valve nozzle 1 has a housing 6 as well as a channel-like material feed 7 to the housing 6 and a material feed 8 into the interior or interior cavity 9 of the housing 6. Furthermore, the needle valve nozzle 1 has a valve needle 10 which can be moved axially in the housing 6 in the usual manner, and a material outlet which can be closed by means of the valve needle 10 in a manner yet to be described.

The closed position of this needle valve nozzle 1 and its valve needle 10 is depicted in FIG. 1. That is, the feeding of material through the material feeds 7 and 8 and the outlet of the needle valve nozzle 1, yet to be described, into the mold 5 is interrupted and blocked.

Figure 2:
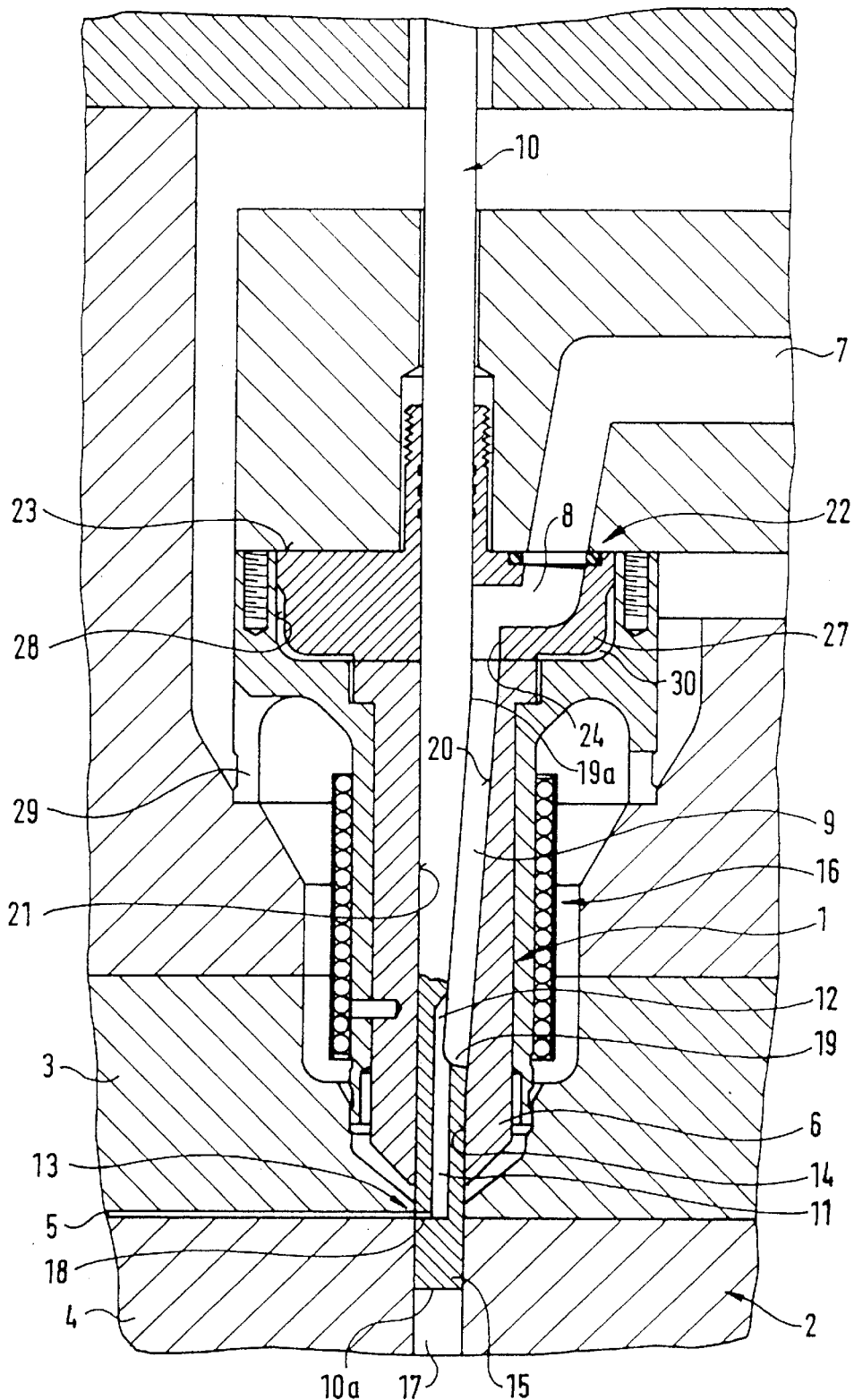
FIG. 2 is a representation corresponding to FIG. 1 in which the needle valve nozzle and its lateral exit are pushed to the level of a mold positioned between a mold insert and a core mold insert, so that the material can be injected directly into the mold through the channel located in the needle and this exit from the narrow side.

In order to eliminate this blockage, thus bringing the valve needle 10 into the open position in which an injection molding process can be conducted, the valve needle 10 is displaced and moved axially out of the position depicted in FIG. 1 in the direction of the arrow Pfl indicated in FIG. 1 beyond the end of the needle valve nozzle 1 and its housing 6, engaging into the mold insert 3 until it assumes the position occupied in FIG. 2 in which the material can reach the mold 5.

In order for this reversed displacement motion of the valve needle 10, in comparison to previously known needle valve nozzles, to lead to opening the needle valve nozzle 1, and above all for the material to be able to be injected from the narrow side into a very flat mold 5 to be able to injection mold a workpiece as flat as possible without flashing the valve needle 10 has a channel 11 for the material running in its interior along its length which is shorter than the valve needle 10. One can see this channel 11 in the two figures on the basis of the representation of the valve needle 10 partially taken in longitudinal section.

In this connection, one can see moreover that an inlet 12 leading into the channel 11 through the valve needle 10 is provided in the inner cavity 9 of the housing, which at the same time is situated at the upper end of this channel 11 in the drawing, and which makes possible a lateral or radial access of the injection molding material to the channel 11 and its initial region so that the material can then flow on through the channel in the valve needle interior.

At least one lateral exit 13 from this channel 11 is provided as the already mentioned outlet before the free end 10a of the valve needle 10 facing the injection mold 5, from which the material can thus be injected into the mold 5 in the pushed open position in FIG. 2. In this regard, this approximately radial exit 13 is positioned on the side of the valve needle 10 opposite the inlet 12. Nonetheless, in contrast to this, an altered position is possible. In this connection, one recognizes that exit 13, which forms the needle valve nozzle 1 outlet which is provided on the valve needle 10, can have a very tiny axial extension, thus practically forming a slit, which under certain circumstances has a lesser height than the mold 5. In the injection molding position, the valve needle 10 in accordance with FIG. 2 with this needle area which has the exit 13 projects out of the housing 6 which has a passage 14 for the valve needle and engages into the injection mold 5 or the mold inserts 3 and 4, such that the material succeeds directly into the mold 5 from the narrow side, without a film sprue being necessary.

After the injection molding process, the valve needle 10 can then be retracted opposite to the arrow Pfl from the injection molding position represented in FIG. 2 into the closed position depicted in FIG. 1.

In order that the injection molding material exits only through the lateral exit 13 and that no valve or similar shut-off acting on it in the injection molding position is necessary at the ends of the canal 11, it is provided in the embodiment shown that the channel 11 in the valve needle 10 interior ends before its free end 10a, and indeed in the embodiment ends directly at lateral exit 13, so that there is also no dead space below or beside the exit 13. This arrangement can be attained, for example, by a channel 11 originally bored through from the end 10a being sealed up to the exit 13, or by a valve needle originally ending in the area of the exit being provided with an adjoining extension 15 in the direction of the arrow Pfl, which, for example, can be welded, especially laser welded, with the valve needle 10 proper.

The lateral exit 13 of the valve needle 10 is closed by the inner wall of the passage 14 of the housing 6 of the needle valve nozzle 1 in the retracted closed position, so that in this position the needle 10 fills this passage 14 on the one hand, and on the other hand, the wall of this passage 14 again blocks the exit 13 on the valve needle 10, so that the needle valve nozzle 1 is thereby completely closed off.

The valve needle 10 with its lateral or radial exit 13 can, in accordance with FIG. 1, be retracted so far into the housing 6 and its passage 14 that the exit 13 is situated in the area or the effective area of a heater 16 provided on the housing 6 in the closed position assumed thereby. In this way, the material situated in the channel 11 and the exit 13 is also kept fluid in the closed position. This applies even when the exit 13, as already mentioned, only has a very slight dimension and, for example, is constructed as a narrow slit positioned on the periphery of the valve needle 10 which reaches up to the channel 11 in the interior of the valve needle 10.

The length of the channel 11 arranged coaxially and centrally in the valve needle 10 is so proportioned in the embodiment that even the inlet 12 into the channel 11 is situated within the housing 6, or at least within a box-like needle guide 27 when the valve needle 10 is retracted into the closed position. In FIG. 1 which depicts the closed position, one clearly recognizes above all that the channel 11 runs only over a relatively short partial area of the valve needle 10, in order to be able to achieve that this channel 11 produces the connection between the interior 9 of the housing 6 and the mold 5 in the injection molding position in accordance with FIG. 2, and to be sure over valve needle 10.

Figure 3:
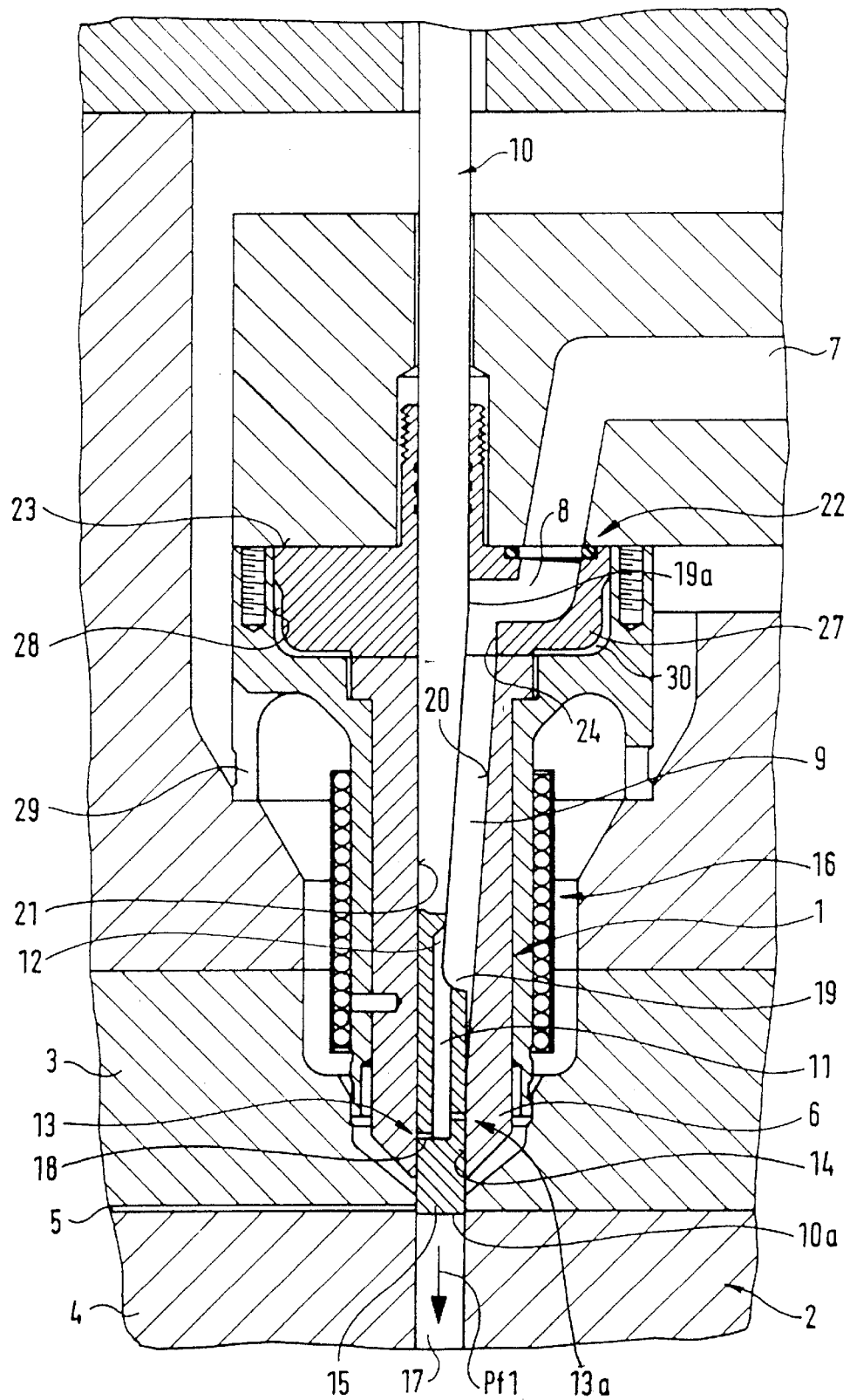
FIG. 3 is a partial longitudinal section through a needle valve nozzle of the invention and the parts of the injection mold adjacent to the nozzle similar to that of FIG. 1 showing a second lateral exit projecting from the needle valve nozzle.

In the embodiment the channel 11 has only an approximately slit-like exit 13 running over a part of the periphery of valve needle 10. It would also be possible to provide several such lateral exits which go off radially or obliquely or even over a curve from the channel 11 and lead to the exterior of the valve needle 10, wherein all these exits 13 can be arranged in the same cross section plane of the valve needle 10 or even be arranged at a distance axially from one another on the valve needle 10 in the event, for example, that several molds 5 situated in the same or even different planes, or areas of one or several molds, should be able to be served by the same needle valve nozzle. FIG. 3 shows one of these exits 13a spaced an axial distance from the exit 13 for communication with another mold (not shown).

In the embodiment, the part 15 of the valve needle 10 which extends beyond the end of the channel 11 and its lateral exit 13 is constructed as a sealing extension 15, which fills the passage 14 of the housing 6 in the closed position, and especially partially extends out of the housing 6 beyond the passage 14, as one recognizes in FIG. 1. It is thus level with the mold insert 3 accommodating the valve needle 10 or with the core mold insert or second mold insert 4 acting in conjunction with it, or even protrudes somewhat into this. This is made possible by the fact that the spraying side mold insert 3 which accommodates the valve nozzle 1 and the form insert 4 which operates in conjunction with it has a hole 17 or a boring coaxial to the injection mold and aligned with the passage 14 of the housing 6 of the needle valve nozzle, whose internal cross section corresponds with the external cross section of the sealing extension 15 of the valve needle 10, whereby this extension 15 engages especially tightly into the hole 17 of the mold insert 4, as one also recognizes in FIG. 2. The hole 17 improves the guidance and also the support of the valve needle 10 even against lateral loads caused by the injection molding material, and provides for sure support of the valve needle 10 when the needle valve nozzle 1 is open in accordance with FIG. 2, when the injection molding material is injected laterally into the mold or cavity through the exit(s) 13 and must thereby perhaps be prevented from entering the seam between the mold inserts 3 and 4, which does not belong to the mold 5.

In the embodiment, the edge 18 of the approximately slit-like lateral exit 13 which is closer to the free end 10a and the sealing extension 15 is constructed as a rim running over a part of the periphery of the valve needle 10. When the valve needle is retracted, it separates the material which comprises the workpiece in the mold 5 from the material which is found in the exit, so that no sprue parts or flashing traces remain on the narrow side of the workpiece. Thus, refinishing is avoided.

In the embodiment the inlet 12 into the channel 11 situated in the valve needle 10 is formed by a recess 19 or milling arranged laterally on the needle, which together with the beginning of the channel 11 forms a cutout, thus penetrating this beginning of the channel 11, so that the corresponding opening for the inlet 12 is formed over a certain axial length of the channel 11. The channel 11 thereby ends in the area of the lateral recess 19, as a further-reaching course would be unnecessary and would if worse came to worst lead to undesirable dead spaces.

The recess 19 starts out beginning 19a which faces away from the free end 10a of the valve needle, and is gradually increasingly worked into the needle cross section (especially obliquely) in the direction of the extension of the valve needle 10. As a result, a basically impedance-free, constant, material feed is formed somewhat oblique to the inlet 12 in the channel 11 together with the inner wall 20 of the housing 6 of the needle valve nozzle 1, as one clearly recognizes in FIG. 2. This beginning 19a of the recess 19 is also located within a bushing-shaped needle guide 27 (yet to be explained) when the valve needle 10 is in the closed position.

The valve needle 10 can be wholly or partly contoured. Nevertheless, apart from the recess 19, it has a basically circular cross section in the embodiment and the channel 11 is located in the center of this cross section and is, for its part in particular, likewise provided with such a circular cross section. Such parts or channels with a circular cross section are, just like the corresponding passage openings 14 or holes 17, especially easy to manufacture. A deviation from the cross section, for example a flattening, can be provided in the exit 13 area, in order to permit a somewhat broader stream of materials to enter into a narrow side of a mold 5 running in a straight line. This is then nevertheless interrupted without gating when the needle is retracted.

One recognizes in FIGS. 1 and 2 that the housing 6 has an inner cavity 9 only on one side. That means that the inner cavity 9 of the housing 6 is eccentrically arranged, and indeed on the side of the valve needle 10 on which the material feed and the recess 19 are located. Furthermore, the housing 6 has a guide 21 which basically runs over its entire axial extension, especially concentrically for the valve needle 10 positioned concentrically in it, on the side facing away from this inner cavity 9, which extends around more than half the periphery of the valve needle 10, so that at least one gap remains free on this guide 21 in the area of the recess 19 for the passage of the injection molding material to the inlet 12 into the channel 11. Consequently, injection molding material running around the needle 10 and dividing the stream of material are avoided. The injection molding material is above all better guided to the inlet 12 into the channel 11 which is located on one side only.

A needle guide 27 constructed as a bushing which encloses the valve needle 10 in its entire cross section is mounted on the end opposite the exit 14 of the housing 6. The material feed 8 into the interior 9 of the housing 6 is in this case constructed as a feeder channel, whose inlet 22 runs from the face 23 to its opening 24 in the housing 6 interior through the needle guide bushing 27 which forms a part of the face 23 of the needle valve nozzle 1 in a radial direction.

At the same time, between the exterior of the bushing 27 and the recess 28 of the nozzle housing 6 which accommodates this an insulation, in the embodiment an air gap 30, is arranged at least in the area adjacent to the mold insert opposite its abutment 29, so that heat losses can be avoided in this area to the greatest extent. Deposits or thickenings of the injection molding material are thus practically ruled out. The liquid state of the material can be preserved appropriately securely despite its being conducted through the channel 11 situated in the needle interior and through the exit 13 up to the mold 5 and its cavity.

By means of this overall arrangement, very flat workpieces can thus be directly injected from one or more of its more of its narrow sides without necessitating a film sprue or corresponding refinishing. Experiments have shown that a workpiece produced in this manner does not show any flashing.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

I claim:

1. A needle valve nozzle (1) for an injection mold (2), comprising a housing (6) having a longitudinal passage (14), a material feed (7,8) to the housing (6) and into an interior (9) of the housing (6), and a valve needle (10) which can be moved axially in the longitudinal passage of said housing (6), the nozzle (1) having a material outlet which can be closed by means of the valve needle (10), the valve needle (10) having a channel (11) running longitudinally in its interior, said channel (11) being shorter than the valve needle (10), wherein an inlet (12) into the channel (11) is provided in the interior (9) of the housing (6), the channel (11) having as an outlet at least one lateral exit (13) in an area before a free end (10a) of the valve needle (10) which faces the injection mold (2), and wherein the free end (10a) of the valve needle (10) in the area of the exit (13) protrudes out of the passage (14) for the valve needle (10) into an injection molding position.

2. The needle valve nozzle according to claim 1, wherein the channel (11) ends before the free end (10a), at the lateral exit (13).

3. The needle valve nozzle according to claim 1, wherein said at least one lateral exit (13) is closed by an inner wall of the passage (14) in a position retracted from the injection molding position.

4. The needle valve nozzle according to claim 1, wherein the valve needle (10) with its lateral exit (13) is retracted into the housing (6) to a closed position, such that the exit (13) in the closed position is positioned in an effective area of a heater (16) provided in the housing (6).

5. The needle valve nozzle according to claim 1, wherein the channel (11) is situated coaxially and centrally in the interior of the valve needle (10) and has a length so proportioned that the inlet (12) into the channel (11) is situated within the housing (6) when the valve needle (10) is retracted to a closed position.

6. The needle valve nozzle according to claim 1, wherein the channel (11) has a plurality of lateral exits (13), which extend approximately radially from the channel (11) and lead to an exterior of the needle valve (10), said exits being arranged at an axial distance from one another in the valve needle (10).

7. The needle valve nozzle according to claim 1, wherein the free end (10a) of the valve needle (10) which extends beyond the end of the channel (11) is constructed as a sealing extension (15) which fills up the passage (14) and partially juts beyond the passage (14) out of the housing (6) and is aligned with a mold insert (3) accommodating the valve needle (10).

8. The needle valve nozzle according to claim 7, wherein the mold insert (3) and a core mold insert (4) operating in conjunction with it has a bore (17) coaxial to the injection mold (2) and aligned with the passage (14), the bore having an internal cross section corresponding to an external cross section of the sealing extension (15), whereby the extension (15) tightly engages in the bore (17) in the injection molding position.

9. The needle valve nozzle according to claim 1, wherein an edge (18) of the at least one lateral exit (13) nearer to the free end (10a) is constructed as a rim.

10. The needle valve nozzle according to claim 1, wherein the inlet (12) is formed by a lateral recess (19) of the needle, which forms a cutout with a beginning of the channel (11).

11. The needle valve nozzle according to claim 10, wherein the channel (11) ends in an area of the lateral recess (19).

12. The needle valve nozzle according to claim 10, wherein the recess (19) starts out slightly obliquely and is gradually increasingly worked into a needle cross section at its beginning (19a) facing away from the free end (10a) of the valve needle (10), so that a basically impedance-free, constant material feed to the channel (11) is formed together with an inner wall (20) of the (1) housing (6).

13. The needle valve nozzle according to claim 1, wherein the valve needle (10) has an essentially circular cross section, and the channel (11) is arranged in its center.

14. The needle valve nozzle according to claim 10, wherein an internal cavity (9) is located eccentrically on a side of the recess (19) and serves to feed material into the channel (11), and the housing (6) has a guide (21) for the valve needle (10) installed concentrically in it on a side facing away from the internal cavity, the guide (21) extending over more than half of a periphery of the valve needle (10), such that a gap for passage of injection molding material remains free on the guide (21) in a region of the recess (19).

15. The needle valve nozzle according to claim 1, further comprising a needle guide constructed as a bushing (27) situated at an end of the housing (6) opposite the exit (13), the bushing (27) enclosing the valve needle (10) in its entire cross section to guide it, and wherein the material feed (8) is constructed as a feeder channel, having an inlet (22) which runs from a face (23) to an opening (24) in the interior (9) of the housing (6) through the needle guide bushing (27), the bushing (27) forming a part of the face (23) of the needle valve nozzle (1) in a radial direction, and further comprising an insulation situated between an outer surface of the bushing (27) and a recess (28) of the nozzle housing (6) which accommodates the bushing (27), the insulation extending at least in an area opposite an abutment (29) of the housing (6) adjacent to a mold insert.

16. The needle valve nozzle according to claim 15, wherein the insulation comprises an air gap (30).

17. The needle valve nozzle according to claim 1, wherein the at least one exit (13) is constructed as a slit running over a part of a periphery of the valve needle (10), the slit being so configured to be in alignment with a boundary of a mold (5) in the injection molding position.

18. The needle valve nozzle according to claim 17, wherein the exit (13) has a shape conforming with a narrow side of a workpiece or the mold (5).

* * * * *